M. J. ALTHOUSE.
Wind-Mill.
No. 128,577. Patented July 2, 1872.

Witnesses.
Harry King
H. W. Dodge.

Inventor.
Milo J. Althouse
by Dodge & Munn
Attys.

128,577

UNITED STATES PATENT OFFICE.

MILO J. ALTHOUSE, OF WAUPUN, WISCONSIN.

IMPROVEMENT IN WINDMILLS.

Specification forming part of Letters Patent No. 128,577, dated July 2, 1872.

SPECIFICATION.

*To all whom it may concern:*

Be it known that I, MILO J. ALTHOUSE, of Waupun, in the county of Fond du Lac and State of Wisconsin, have invented certain Improvements in Windmills, of which the following is a specification, reference being had to the accompanying drawing.

My invention consists in certain improvements upon the windmill patented to L. H. Wheeler September 10, 1867, whereby the same is rendered more perfectly self-regulating, as hereinafter more fully explained.

Figure 1:
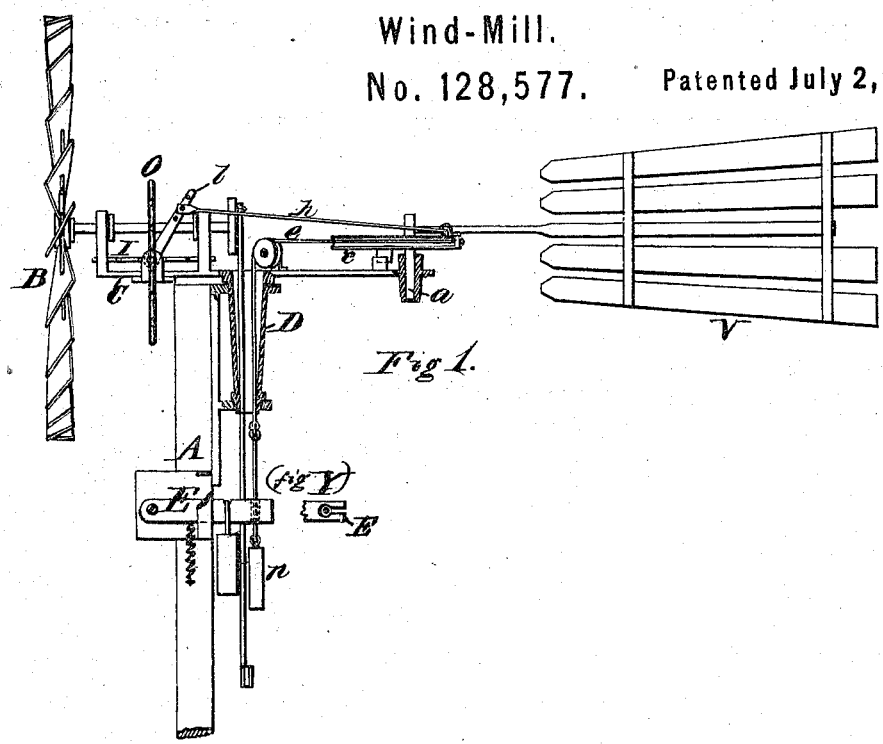
Figure 2:
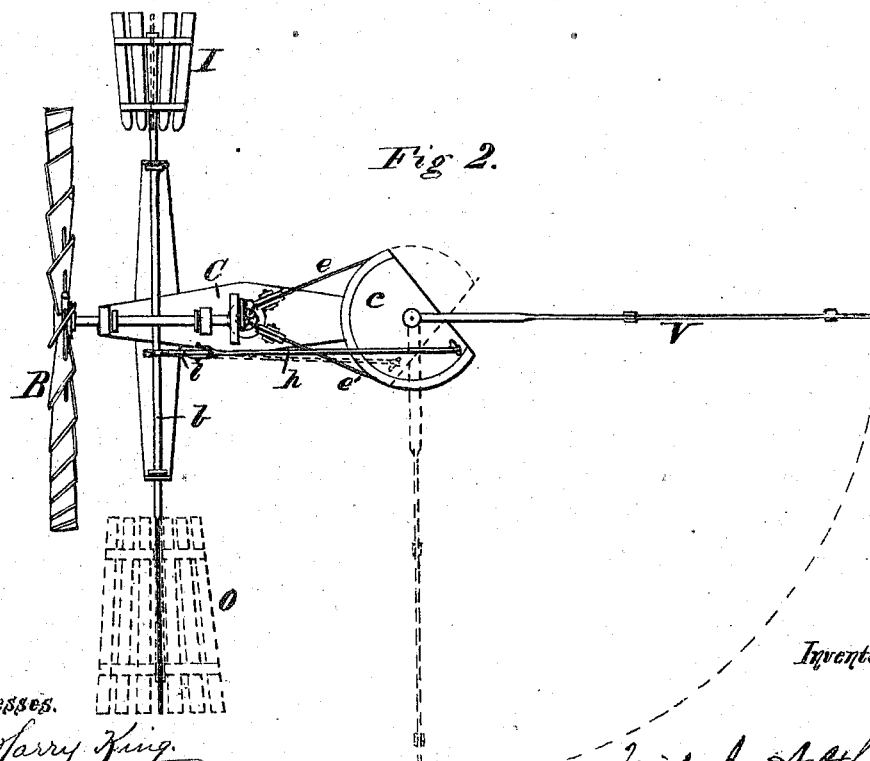

Figure 1 is a side elevation, and Fig. 2 is a top plan view, of the apparatus with my improvement applied.

The general construction, being the same as that of the patent of Wheeler hereinbefore referred to, need not be herein described, reference being made to said patent therefor.

In the machine as patented by Wheeler the main frame had a stationary wing attached thereto, and standing at right angles to the face of the wheel, for the purpose of causing the wheel to turn edgewise to the wind as the latter increased in force, and thereby to regulate its motion, the vane V being pivoted to the main frame C, so that while the latter was swung around by turning of the wheel-edge to the wind the vane would still stand parallel with the line of motion of the wind, as represented in Fig. 2. In that case the wheel was brought back face to the wind by a weight, $n$, attached to a cord or chain, $e$, which passes over a pulley, and from thence extends back and is connected to a segment or cross-head, $c$, attached rigidly to the vane V, as represented in Figs. 1 and 2. The weight exerts its force to draw the vane V broadside to the wind, and the wind acting on the vane V then causes the wheel to swing around face to the wind; but in so doing the fixed laterally-projecting wing $o$ was acted upon also, and that again tended to keep the wheel out of the wind, frequently overcoming entirely the force of the weight, and thus causing the wheel to remain idle for a long time, or comparatively so. Now, to remedy this defect, and render the machine more perfectly self-regulating, I proceed as follows: Instead of using a rigid lateral wing to turn the wheel out of the wind I mount across the front of the frame C a shaft, $b$, (see Fig. 2,) which has a wing on each end, the larger wing $o$ occupying the same relative position as the stationary wing in the original or Wheeler machine. The wing I on the opposite end of the shaft $b$ is set at right angles vertically to the wing $o$, as shown in Fig. 1, their longitudinal axes both being in the same plane as that of the shaft, to which they are rigidly attached. The shaft $b$ is mounted loosely in suitable bearings on the frame C, and has attached to it an arm, $l$, which projects vertically, as shown in Fig. 1. This arm $l$ is connected by a rod, $h$, to the segmental cross-head $c$ of the vane V, as shown in Figs. 1 and 2.

The result of this construction and arrangement is that when the wind operates upon the wing $o$ and swings the wheel around edge toward the wind the rod $h$, operating on the arm $l$, turns the shaft $b$, thereby causing the wing $o$ to turn edgewise to the wind, the wing I at the opposite end of the shaft being at the same time turned broadside or face to the wind to the same extent. By this means it will be seen that not only is the force of the wind upon the wing $o$ reduced, but at the same time it is caused to act upon the opposite wing I, which tends to bring the wheel back face to the wind, and that the face of one wing is turned to the wind just in proportion as the other is turned from it, and vice versa.

In order to facilitate the replacement of the wheel face to the wind I pivot to the upright standard A one end of a swinging arm, E, the other end having a vertical opening in it for the rod, to which is attached the weight $n$, to pass through, the opening being shown in the top-plan view of a portion of the arm at Y, Fig. 1. The weight $n$ hangs a little below the arm E, Fig. 1, so that in its upward course or ascension the weight $n$ will lift up the outer or free end of the arm, to which is also attached a weight or spring, or both, as may be desired, both being shown in Fig. 1, thus accumulating power to assist in drawing back to the wind the face of the wheel. By these means the wheel, instead of remaining turned edge to the wind for any considerable length of time, as it formerly did, is almost instantly brought back more or less.

The wing $o$, which tends to turn the wheel from the wind, is made much larger than the wing I which brings it back, as shown by Fig. 2; but this is not essential.

It is obvious that the one wing $o$ may be used alone so long as it is made to turn edgewise, as described; but I prefer to use the two wings, one on each end of the shaft.

Having thus described my invention, what I claim is—

1. In combination with a wind-wheel, B, the rock-shaft $b$ provided with one or more wings attached thereto, the said parts being arranged to operate substantially as described.

2. The combination of the wheel B with the rock-shaft $b$, connected by the arm $l$ and rod $h$ to the pivoted vane V, all arranged to operate substantially as set forth.

3. In combination with a wind-wheel having its vane pivoted to the body, I claim the lever E provided with a weight or spring, with a cord or chain, $e$, connected at one end to the pivoted vane, and having a weight, $n$, arranged at its other end to come in contact with the lever E as the wheel is turned to one side, for the purpose of assisting in returning the wheel to its position facing the wind, substantially as described.

MILO J. ALTHOUSE.

Witnesses:
W. C. DODGE,
HARRY KING.